March 16, 1948. W. M. BREADY 2,438,032
CARGO TRAILER HITCH
Filed Sept. 21, 1945 2 Sheets-Sheet 1
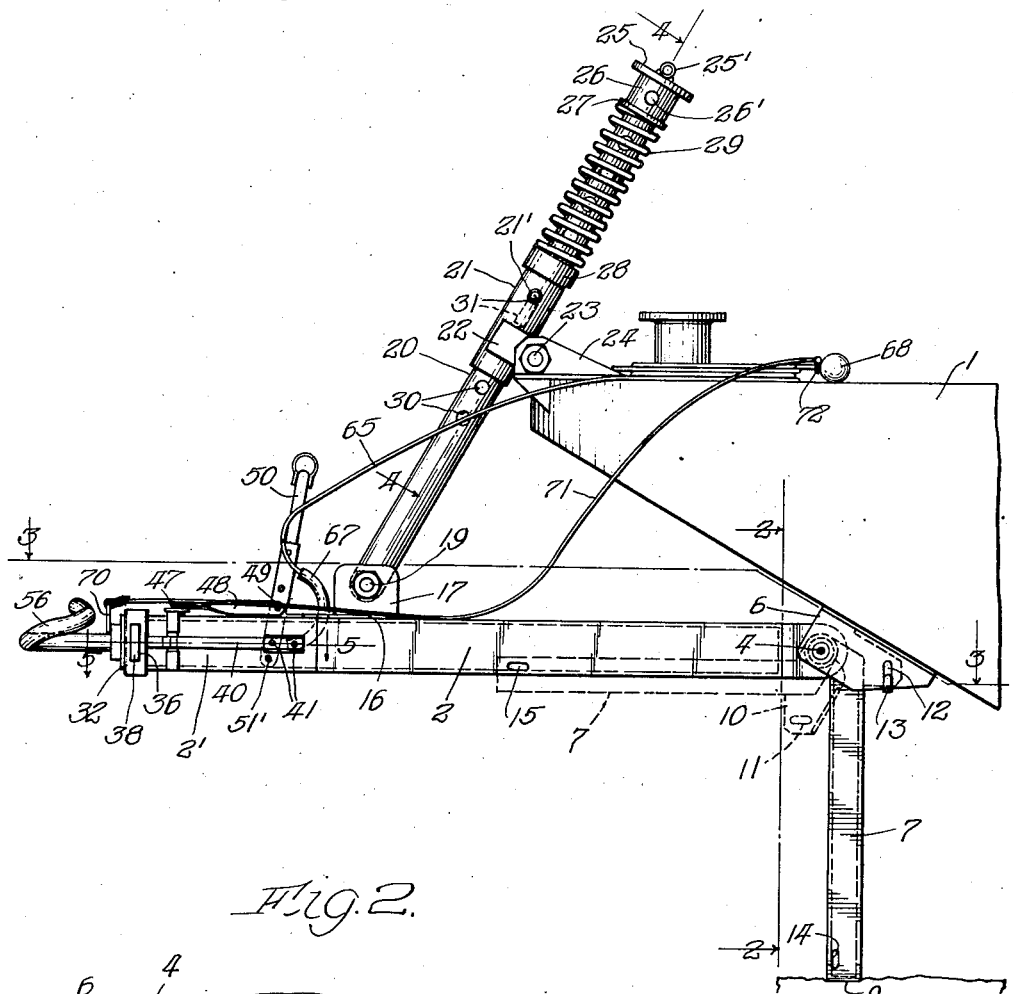
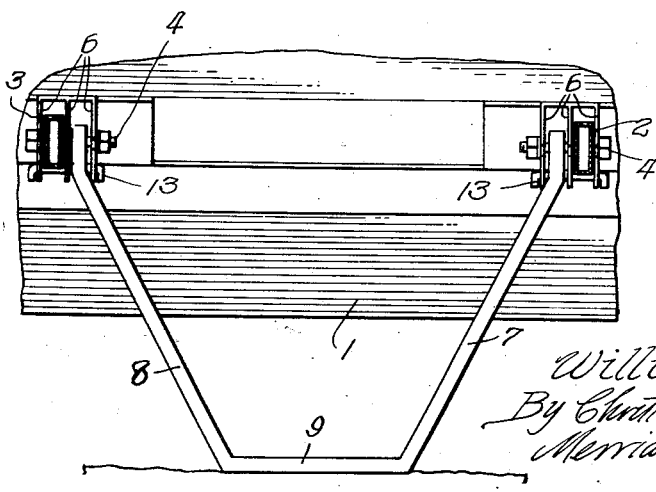
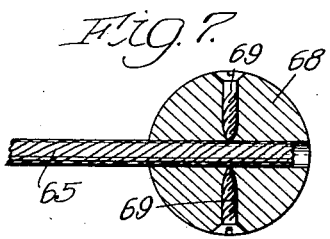
Inventor:
William M. Bready,
By Chritton, Wiles, Schroeder,
Merriam, & Hofgren, Attys.

March 16, 1948.  W. M. BREADY  2,438,032
CARGO TRAILER HITCH
Filed Sept. 21, 1945    2 Sheets-Sheet 2
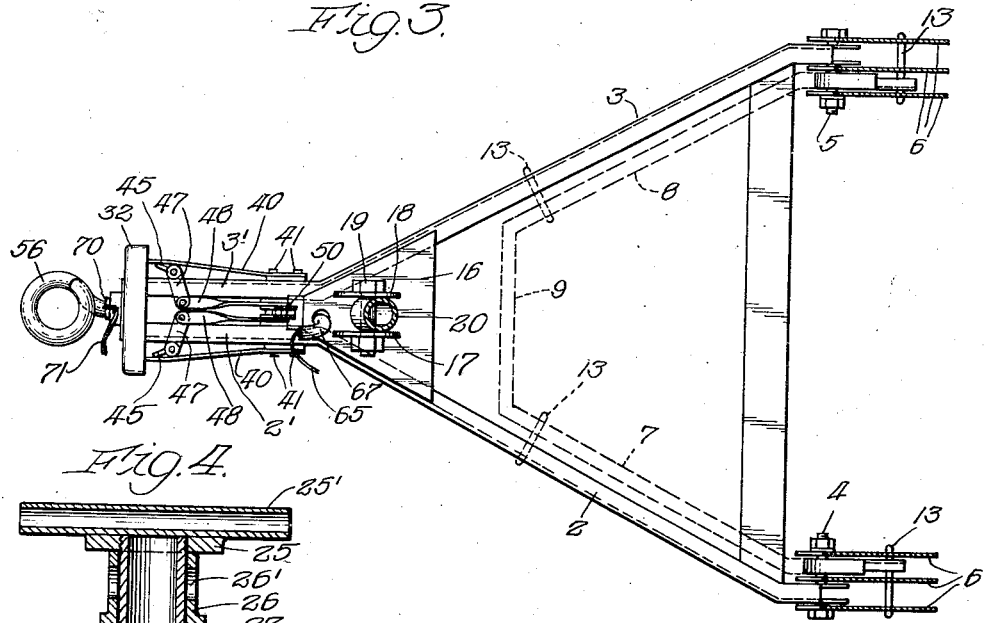
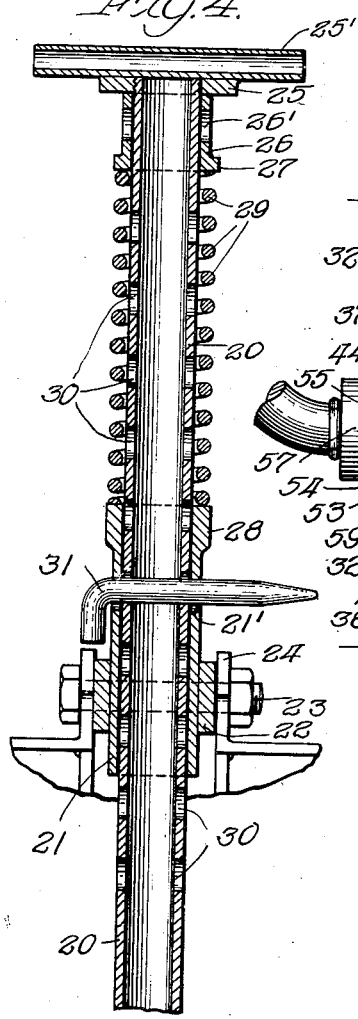
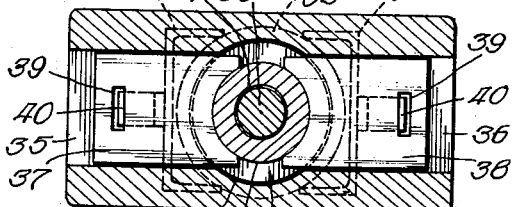
Inventor:
William M. Bready,
By Chritton, Wiles, Schroeder,
Merriam, & Hofgren, Attys.

Patented Mar. 16, 1948

2,438,032

UNITED STATES PATENT OFFICE 2,438,032

CARGO TRAILER HITCH

William M. Bready, Milwaukee, Wis., assignor to Cleaver-Brooks Company, Milwaukee, Wis., a corporation of Wisconsin Application September 21, 1945, Serial No. 617,811

10 Claims. (Cl. 280—33.15)

This invention relates to a cargo trailer hitch and more particularly to a hitch that may be used for pulling a cargo-laden trailer on either land or water.

In war, as well as in peace times, it is of great importance to be able to unload watertight cargo trailers from ships onto the surface of the water, transport them across the intervening surface of water, and land them with a dry cargo on beaches, as well as to be able to transport such cargo trailers by trailing them from tanks, trucks and the like on land. The present invention fulfills all of these requirements in a novel and practical manner.

Among the objects of my invention are to provide a novel and improved cargo trailer hitch; to provide such hitch of novel construction and adjustable to suit different requirements; to provide novel means for quickly and easily hitching the trailer to the prime mover, and releasing it therefrom when required; to provide a cargo trailer hitch that will enable a free floating action of the trailer when being transported on water, as well as a more rigid support when the trailer is being pulled on land, this support being capable of varying vertical adjustment to suit different heights of hitch; to provide novel means for supporting the front end of the trailer when the hitch is disconnected from the prime mover when being used on land; and to provide novel means for releasing a cable from the trailer after the hitch has been released when freeing the trailer from the prime mover in an emergency on the water.

Other objects and advantages will become readily apparent from the following detailed description taken in connection with the accompanying drawings wherein:

Fig. 1 is a side elevation of a cargo trailer hitch embodying my invention and showing the front end of the trailer supported on land when the hitch is released.

Fig. 2 is a vertical transverse section on the line 2—2 of Fig. 1.

Fig. 3 is a top plan view of my hitch from the line 3—3 in Fig. 1, some of the parts being shown in section for the sake of clearness.

Fig. 4 is an enlarged fragmentary longitudinal central section through a portion of the hitch column.

Fig. 5 is an enlarged horizontal longitudinal section on the line 5—5 of Fig. 1.

Fig. 6 is a vertical transverse section on the line 6—6 of Fig. 5.

Fig. 7 is a fragmentary longitudinal section through a portion of the rear end of the cable and cable stop.

My invention further resides in the combination, construction and arrangement of parts illustrated in the accompanying drawings, and while I have shown therein a preferred embodiment, I wish it understood that the same is susceptible of modification and change without departing from the spirit of my invention.

Referring more in detail to the drawings, my hitch as shown in Fig. 1 is attached to the front portion of a trailer 1, and comprises a tongue having a pair of angularly positioned side members 2 and 3 (see Fig. 3) preferably formed of steel channel members with the web facing outwardly. These side members are pivotally connected to the trailer by pivot pins 4 and 5 extending through angle plates 6 secured to the inclined bottom of the front portion of the trailer. An inner pair of channel irons 7 and 8, which are connected together at their forward end by a cross member 9, are also pivoted at the pivot pins 4 and 5 and capable of being swung downwardly with relation to the tongue from the dotted line to the full line position in Fig. 1 to form a support for the front end of the trailer when used on land.

Fixed to one or both (as desired) of the supports 7 and 8, at the rear end, is an angle plate 10 having a transverse slot 11 at its lower end (when the support or leg is swung up to horizontal position as shown in dotted lines in Fig. 1) so that when the support or leg is moved downwardly into vertical position, the slot 11 will register with a slot 12 in the angle plate 6 to permit of pins 13 being passed through both sets of these slots (Fig. 2), to prevent the supporting legs from being inadvertently moved and cause the front end of the trailer to fall. Similar slots 14 are formed in the bottom end of the supporting legs and slots 15 are provided in the side of each of the side members 2 and 3 so that, when the supporting legs are swung upwardly to horizontal position, pins 13 can be inserted through slots 14 and 15 to hold the legs in horizontal position within arms 2 and 3 of the hitch. If desired, the same pins 13 may be used for the two different positions of the supporting legs and such pin may be attached to an adjacent part by a rope, chains, or the like to insure that it will be quickly available when needed.

Secured by welding or otherwise, across the front end of the angular side bars 2 and 3 is a top plate 16 to which are fixed a pair of upstanding parallel ears 17 and 18, between which is mounted by a bolt 19 the bottom end of a hitch column 20 so that the hitch column, if required, may have a slight swinging movement about bolt 19. This hitch column extends angularly upwardly and rearwardly and is longitudinally slidable in a sleeve 21 (Figs. 1 and 4), which has fixed thereto at its two diametrically opposite sides a pair of ears 22 extending rearwardly therefrom. A bolt 23 passes through the ears 22 and through the vertical sides of a pair of spaced apart angle plates 24 secured to the trailer. Fixed at the top end of the hitch column 20 is a head 25 carrying a cross bar 25'. Below this head is a sleeve 26 slidable with relation to the head 25 and the hitch column 20. Formed at the lower end of the sleeve 26 is an annular flange 27 and formed at the upper end of the sleeve 21 is an annular flange 28, between which flanges and encircling the hitch column is a coil spring 29. Formed at longitudinally spaced locations along the hitch column are a series of holes 30 extending transversely through the side walls of the hitch column, so that a hitch pin 31 can be passed through similar holes 21' in the sleeve 21 and through any one of the holes 30 desired, to permit the tongue arms 2 and 3 to be moved upwardly or downwardly as may be required, to accommodate different levels of hitch for different vehicles on land.

When the hitch is being used for a trailer riding on the water, the pin 31 may be taken out of the sleeve 21 and placed in a hole 26' in sleeve 26, and through one of the holes 30 to insure free floating action of the front end of the trailer when coupled to a prime mover. As mentioned above, when the trailer is being pulled by a tank, truck or the like on land, the pin 31 will be inserted through the holes 21' in the sleeve 21 and through any one of the holes 30 required to accommodate the particular height of hitch. Thus, instead of providing a free floating action as in water, a rigid hitch to the prime mover is provided, which is more desirable on land.

At a point adjacent the forward end of the plate 16, the side arms 2 and 3 are bent to extend forwardly in the form of two spaced apart parallel arms 2' and 3' (Figs. 1, 3, 5 and 6) which, in view of the fact that these side arms are channel members, form a head portion which in cross section is a rectangular box-like structure, within which is mounted towing means for releasably securing the trailer to the prime mover. Rigidly fixed in any suitable manner to the front end of the parallel side arms 2' and 3' is a hollow cross member 32 extending a slight distance laterally on each side of these side arms and provided with a central rearwardly extending tubular portion 32'. Extending centrally through cross member 32 and said tubular portion is a bore 33 adapted to slidably receive a coupling or cone member 34. Extending through each end of the cross member 32 from the central opening 33 to the outer end are rectangular openings 35 and 36 (Figs. 5 and 6) which respectively receive sliding dogs 37 and 38. Each of these dogs is formed with an opening 39 into which extends the end of a spring arm 40 fixed at its rear end by bolts or the like 41 and spacing blocks 42 to the side faces of the side arms 2' and 3'.

As seen best in Figs. 5 and 6, the ends of spring arms 40 pass through slots 43 so that when the free ends of these spring arms are moved outwardly these arms will slide in slots 43 and move the dogs 37, 38 outwardly whereby their inner ends are moved out of a circumferential groove 44 in the coupling or cone member 34, to free said member, as will be more fully explained hereinafter. This outward movement of spring arms 40 (which normally stand in their inward position) is effected by cam arms 45 (one on each side of the head portion 2', 3') fixed to the bottom ends of vertical rods 46 which have fixed at their upper ends inwardly extending arms 47 (Figs. 1 and 3) to the inner ends of which links 48 are pivotally connected. These links are midway thereof bent from a horizontal position to a vertical position and at their other ends are pivotally connected by pins 49 to an intermediate portion of a release lever 50. Lever 50 comprises at its lower end two arms bent outwardly to be rotatably mounted on side arms 2', 3' by a sleeve 51 through which extends a bolt 51' (Fig. 1) secured to these side arms. This construction enables the release lever to be swingably moved forwardly (counterclockwise) about the bolt 51' to cause longitudinal movement of the links 48 to swing the arms 47 and the cams 45 to separate the spring arms 40, which in turn move the dogs 37 and 38 outwardly to release the coupling member. When the release lever is moved in the opposite direction, it permits these dogs, under action of the spring arms 40, to return to their inner position to engage the circumferential groove 44 in the coupling member.

As seen in Fig. 5, the coupling member 34 has a conical portion 52, the smaller end of which is small enough to pass by the inner ends of the dogs 37, 38 (when in their closed position) and move them outwardly against the action of spring arms 40 when the coupling member is being inserted into position in the head. In order to provide access to the hollow interior of the coupling member, it is formed in two parts which are screw threaded (see Fig. 5), a part 53 having thereon the circumferential groove 44 referred to above. Part 53 is formed with a longitudinal bore 54 through which extends a shank 55 of a pigtail towing ring 56. Fixed to shank 55 is a collar 57 abutting against the outer face of the part 53 of the coupling member. As seen in Fig. 5, shank 55 extends into the hollow interior of the coupling member and is encircled by a coil spring 58 which is compressed between a shoulder 59 on part 53 and a collar 60 on the shank. A nut 61 is screw threaded to the inner end of shank 55 to back up the collar 60 and is preferably held in place by a cotter pin 62. With the parts thus assembled, the coil spring 58 affords a yielding pull upon the trailer.

Extending through the small end of the coupling member is a hole 63, opening into a slot 64 formed in the nose of the member. Extending through the slot 64 and hole 63 is a cable 65 upon the inner end of which, inside of the hollow interior of the coupling member, is a fastening head 66 to prevent this end of the cable from being pulled out of the cone member. As will be understood, the cable 65 will be inserted through the interior of the coupling member when the parts thereof are separated, and the cable is pulled through hole 63 until head 66 strikes the inside of the coupling member end.

Cable 65 extends from the coupling member and is slidably threaded upwardly through a curved pipe 67, which as seen in Figs. 1 and 3 extends upwardly above the upper face of the plate 16 and occupies preferably a slight sidewise position at its upper end in order to clear the release lever 50. As seen in Fig. 1, cable 65 after passing upwardly through the curved tube 67, is, when the cone is in place in the head plate 32, passed upwardly and backwardly and loosely coiled upon the upper front end of the trailer in such a manner as to be always free of any projections thereon, to enable it to be quickly pulled therefrom should emergency require a quick release of the trailer from the prime mover. Fixed to the rear end of the cable 65 is a spherical cable stop 68 (Figs. 1 and 7), which is preferably of shatterable material such as wood, or the like, and is secured to the cable by screws 69. When the hitch of the present invention is suddenly released from the trailer (by means of release lever 50) because of an emergency the cable 65 can freely slide through the curved tube 67 and the cable stop 68, when it strikes the end of this tube, will be shattered and free the cable from the trailer.

To facilitate handling the cable of this hitch when the trailer is floating upon water, I have provided an ear or ring 70 (Figs. 1 and 3) to which is fastened one end of a rope 71 of suitable length, and at the other end of which is fixed a ring member 72 slidable over the cable so as to prevent this ring from sliding past the cable stop.

From the above it will be understood that in making the hitch, for example when the trailer is floating on water, all that is necessary is to back the prime mover into close proximity to the front end of the trailer, pull the rope and cable from the trailer with a boat hook or the like, and pull the release lever forwardly with the boat hook or the like so as to release the coupling member which will then pull out of its anchorage in the cross member 32 by a pull on the rope. The cable 65 will simultaneously move through the curved tube 67 but not fast enough to cause the cable stop to be broken. Preferably at this time, the free end of the cable will be pulled forwardly by the rope 71 and held manually by an operator on the prime mover. The pigtail towing ring 56 will then be hooked into any suitable hook, ring or other anchorage on the prime mover and the trailer moved up to the prime mover (as by pulling on the cable). The coupling member is inserted through the opening in the end plate 32, the dogs 37, 38 moving outwardly until the circumferential groove 44 registers with the inner ends of the dogs at which time these dogs will move into this groove under action of the spring arms 40. This anchors the coupling member in the cross member and completes the hitch, the excess portions of the cable and rope being again placed on the front end of the trailer.

As stated, when the trailer is floating upon the water, the spring 29, by proper placing of the pin 31, will give a free floating action to the front end of the trailer to accommodate movement by waves, or other rough movement of the water. When the trailer is attached to a tank, truck or other land vehicle, the hitch does not have to have this free floating action, and the pin 31 at that time will be passed through the sleeve 21 and one of the holes 39 to give the desired height of hitch to accommodate such land vehicle.

I claim:

1. A hitch for a trailer for use on land and water, comprising, a tongue member, and a hitch column pivotally connected to the tongue member and to the trailer, said pivotal connection between the hitch column and the trailer including a member having an opening therethrough through which the hitch column is slidable and resilient means on the hitch column whereby the trailer will be free floating in the water, and further means on the hitch column to provide a rigid hitch on land and selectively hold the hitch column against sliding through the opening in said member.

2. A hitch for a trailer, comprising, a tongue member having a head portion formed with a receiving socket, a coupling member adapted to be detachably inserted into said socket, a hitch column pivotally connected to the tongue member and to the trailer, resilient means on said hitch column, and means for selectively holding the hitch column rigid with the trailer and tongue and when desired releasing the hitch column so that the trailer will float free on the resilient means.

3. A cargo trailer hitch, comprising, a tongue member having a head portion formed with a receiving socket, a coupling member adapted to be slidably inserted into said socket and having on its forward end a connecting member, means for releasably holding the coupling member in the socket whereby a trailer may be quickly released from a prime mover, and a cable fixed to the coupling member and extending to the outside of said socket, said tongue having tubular guide means extending laterally from said head portion for slidably receiving said cable, and a cable stop on the cable.

4. A cargo trailer hitch, comprising, a tongue member having a head portion formed with a receiving socket, a coupling member adapted to be slidably inserted into said socket and having on its forward end a connecting member, means for releasably holding the coupling member in the socket whereby the trailer may be quickly released from a prime mover, a cable fixed to the coupling member and extending to the outside of said socket, said tongue having tubular guide means extending laterally from said head portion for slidably receiving said cable, a cable stop on the cable, and a rope connecting the coupling member and the cable outside of the socket.

5. A hitch for a cargo trailer, comprising, a tongue member mounted on the trailer and having a hollow head portion formed with a receiving socket, a coupling member releasably mounted in said socket, a cable fixed to the coupling member and extending to the outside of the socket, guide means for guiding the cable laterally from the interior to the exterior of the hollow head portion, a cable stop on the cable, said cable stop being of breakable material so that in an emergency release of the trailer upon release of the coupling member from the socket, the cable may run through the guide means and the cable stop broken loose from the cable by striking the end of the guide means to free the coupling member and cable from the trailer.

6. A hitch for towing an amphibious watertight cargo trailer on land and water, comprising, a tongue member swingably connected to the trailer, a coupling member releasably connected to the tongue member, a hitch column pivotally connected to the tongue member, a sleeve pivotally connected to the trailer, the hitch column being longitudinally slidable in the sleeve, a coil spring surrounding the hitch column above the sleeve, the hitch column having a series of longitudinally spaced holes extending laterally therethrough, the sleeve having a hole extending laterally therethrough, and a pin adapted to be selectively inserted in any of said holes.

7. A cargo trailer hitch, comprising, a tongue member having a head portion formed with a hollow interior, a coupling member adapted to be releasably inserted into said hollow interior, a cable fixed to the coupling member, a curved tube fixed to the tongue member and having one end within the hollow interior and its other end on the outside thereof and facing toward the front, said cable slidably passing through said curved tube so that the cable may extend a substantial distance beyond the front end of the tongue member and be slidably pulled through the curved tube to assist in inserting the coupling member into the hollow interior.

8. A hitch for towing an amphibious watertight cargo trailer on land and water, comprising, a tongue member swingably mounted upon the trailer and having adjacent its forward end a head portion formed with a hollow interior, a coupling member having one end tapered and the other end formed with a circumferential groove, said head portion having an opening leading longitudinally into the hollow interior and a pair of openings leading laterally into the first mentioned opening, a dog slidably mounted in each of said lateral openings, a spring bar for each dog to urge the same inwardly to cause the inner ends of the dogs to enter said groove, a cam for each spring bar to move the bar and its dog outwardly, a release lever to operate said cams, and an attaching member extending forwardly from inside the coupling member and having resilient cushioning means on the inside of the coupling member, whereby upon operation of the release lever the coupling member may be released from the hollow interior of the head portion by the cams moving the spring bars and dogs outwardly to remove the dogs from the circumferential groove, and the coupling member may be returned into said hollow interior and fixed therein by a straight longitudinal push.

9. A hitch for towing an amphibious watertight cargo trailer on land and water, comprising, a tongue member swingably mounted upon the trailer and having adjacent its forward end a head portion formed with a hollow interior, a coupling member having one end tapered and the other end formed with a circumferential groove, said head portion having an opening leading longitudinally into the hollow interior and a pair of openings leading laterally into the first mentioned opening, a dog slidably mounted in each of said lateral openings, a spring bar for each dog to urge the same inwardly to cause the inner ends of the dogs to enter said groove, a cam for each spring bar to move the bar and its dog outwardly, a release lever to operate said cams, an attaching member extending forwardly from inside the coupling member and having resilient cushioning means on the inside of the coupling member, whereby upon operation of the release lever the coupling member may be released from the hollow interior of the head portion by the cams moving the spring bars and dogs outwardly to remove the dogs from the circumferential groove, and the coupling member may be returned into said hollow interior and fixed therein by a straight longitudinal push, a cable fixed to the coupling member to extend from the interior to the exterior of said hollow interior, and a curved open ended tube leading from the interior to the exterior of the hollow interior adjacent its rear end, said cable being slidable in the curved tube to assist in returning the coupling member into said hollow interior, said tube being curved rearwardly from its bottom open end to its intermediate portion and then forwardly to its open upper end to facilitate sliding movement of the cable therethrough when pulled from a distance in front of the head portion.

10. In a hitch for a cargo trailer, a tongue member swingably connected to the trailer, a supporting leg swingably mounted concentrically with the tongue member, means for locking the leg against swinging movement when the leg stands in approximately vertical position, said means including an angular extension on the rear end of the leg for striking the trailer to effect the vertical positioning of the leg, and a bracket on the trailer with registering openings in the angular extension and the bracket to receive a pin therethrough.

WILLIAM M. BREADY.

REFERENCES CITED

The following references are of record in the file of this patent:

UNITED STATES PATENTS

| Number | Name | Date |
| --- | --- | --- |
| 331,235 | Hein | Nov. 24, 1885 |
| 1,333,384 | Buller | Mar. 9, 1920 |
| 1,610,902 | Tomlinson | Dec. 14, 1926 |
| 2,062,788 | Jacob | Dec. 1, 1936 |
| 2,120,637 | Van Doorne | June 14, 1938 |
| 2,133,065 | Weber | Oct. 11, 1938 |
| 2,170,983 | Adams | Aug. 29, 1939 |
| 2,207,812 | McClellan | July 16, 1940 |

FOREIGN PATENTS

| Number | Country | Date |
| --- | --- | --- |
| 14,915 | Australia | Oct. 24, 1933 |
| 421,730 | Great Britain | Dec. 31, 1934 |
| 424,450 | Great Britain | Feb. 21, 1935 |
| 579,711 | Germany | June 30, 1933 |